United States Patent Office 2,865,703
Patented Dec. 23, 1958

2,865,703

PROCESS OF PURIFYING URANIUM

Glenn T. Seaborg, Chicago, Ill., Edwin F. Orlemann, Albany, Calif., and Lyle H. Jensen, Seattle, Wash., assignors to the United States of America as represented by the United States Atomic Energy Commission No Drawing. Application August 16, 1946
Serial No. 691,162

1 Claim. (Cl. 23—14.5)

This invention relates to methods for removing foreign substances from compositions comprising said substances and uranium, and more particularly this invention relates to procedures for purifying uranium.

One object then of the present invention is to provide a method for the separation and purification of uranium from compositions of uranium and elements of lower atomic weight, particularly elements having an atomic number below about 27.

Another object of this invention is to provide uranium of such purity that it can be used as a fissionable material in either slow- or fast-neutron chain-reacting systems.

A further object of the present invention is to provide suitable precipitation and extraction procedures for the purification of uranium.

Other objects and advantages of this invention will be apparent from the following description and the appended claims.

In accordance with the present invention uranium may be purified by precipitating it in the tetravalent state from aqueous solution, dissolving the precipitated uranium, oxidizing the uranium to the hexavalent state, and then extracting the uranium from the resulting solution by means of a suitable organic solvent. In addition, this invention contemplates successive precipitations of uranium using either the same or different precipitating agents, and successive extractions using the same or different solvents.

Insoluble compounds of tetravalent uranium which may be employed in this process are uranous molybdate, oxalate, sulfite or periodate, potassium uranous sulfate, uranous m-nitrobenzoate, or uranous phenoxyacetate. The conditions under which these precipitations will be carried out will, of course, vary depending upon the particular precipitating agent being used. For example, the molybdate may be precipitated by adding ammonium molybdate to an aqueous solution of uranous ion, the pH of which is approximately 2. In the case of uranous oxalate the precipitation may be carried out in strongly acid solutions because of the extreme insolubility of this compound. In general, it may be said that the choice of the precipitating agent will be influenced by the acidity at which it is desired to carry out the process.

The precipitated uranous compound may then be separated from the supernatant liquid by any convenient means, such as filtration or centrifugation. After the precipitate has been separated, it may be washed either with distilled water or a dilute solution containing the precipitating agent. The precipitate may then be dissolved and the uranium be oxidized to the hexavalent state in a single operation, if desired, by heating the precipitate with nitric acid. Alternatively the precipitate may be dissolved in other acids, or it may be metathesized or otherwise treated so that the uranium is dissolved and oxidized to the hexavalent state.

The hexavalent uranium may then be extracted from the aqueous acid solution by means of an immiscible organic solvent. The aqueous solution of hexavalent uranium should be substantially free from anions, for example, sulfate, chloride, phosphate or fluoride, which form stable, water-soluble complexes with the uranyl ion. Preferably the hexavalent uranium will be extracted from an aqueous nitric acid solution.

In order to improve the extraction of uranium into the organic phases, it is generally desirable to incorporate a salting-out agent in the aqueous solution. The preferred salting-out agents for use in the present invention are those having a common anion with respect to the compound being extracted. Thus, if a nitrate of uranium is being extracted, the salting-out agent is preferably an inorganic nitrate. Examples of suitable salting-out agents for this purpose are:

| | |
|---|---|
| $NaNO_3$ | $Ca(NO_3)_2$ |
| $KNO_3$ | $Sr(NO_3)_2$ |
| $LiNO_3$ | $Mg(NO_3)_2$ |
| $NH_4NO_3$ | $La(NO_3)_3$ |
| $Mn(NO_3)_2$ | $Al(NO_3)_3$ |

The concentration of the salting-out agent which is desirable in any particular case will depend on the valence of the cation and the concentration of the common anion due to any free acid in the solution. For example, in the case of 1 N nitric acid solutions, it is desirable to employ a concentration of a univalent nitrate of at least 3 M, and preferably 5–10 M. Equivalent concentration of polyvalent nitrates may be employed at the same acid concentration, and the salt concentration may be increased or decreased with decrease or increase in acid concentration.

The extraction agents which are suitable for use in this process comprise normally liquid organic solvents which are substantially immiscible with the aqueous solution to be extracted and which contain at least 1 atom capable of donating an electron pair to a coordination bond. Such solvents suitably comprise water-immiscible organic compounds containing an oxygen, sulfur, or nitrogen electron-donor atom. It will be evident, however, that most nitrogen-containing organic compounds of this type are basic in nature and will be unsuitable for the extraction of acidic aqueous solutions. Such compounds may be used, if desired, to extract substantially neutral solutions containing small amounts of hexavalent uranium. Most organic solvents containing oxygen or sulfur donor atoms may be used for the extraction of acidic aqueous solutions as well as neutral solutions, and the oxygenated organic solvents are the preferred extractants for use in the present process.

Although most normally liquid organic compounds containing an atom with excess electrons, such as oxygen, sulfur, or nitrogen, are capable of forming a coordination bond, it will be evident to those skilled in the art that certain molecular structures can interfere with this electron-donating property. Electron-attracting constituents such as halogen atoms can offset the electron-donating property of an atom such as oxygen, if present in sufficient number and a certain relationship to the donor atom. For this reason it is preferable to employ compounds containing only carbon, hydrogen and electron-donor atoms. It will also be apparent that certain molecular configurations can give rise to steric hindrance which may interfere sufficiently to prevent the formation of coordination bonds. Tertiary carbon atoms adjacent an electron-donor atom and long chains of non-donor atoms linked to a donor atom are especially undesirable in this respect. The preferred solvents are those in which the donor atom is linked to a hydrogen atom or to non-tertiary carbon atoms and in which at least one component linked to the donor atom contains less than four consecutive non-donors atoms.

The following are examples of suitable solvents for use in the present process:

| | |
|---|---|
| Ethyl ether | Methyl amyl ketone |
| 2-phenoxyethanol | Methyl ethyl ketone |
| 2-benzyloxyethanol | Methyl isobutyl ketone |
| 1,2-diethoxyethane | Mesityl oxide |
| 1-ethoxy-2-butoxyethane | Acetophenone |
| 1,2-dibutoxyethane | Cyclopentanone |
| 5,8,11,14,17-pentoxaheneicosane | Cyclohexanone |
| o-Nitroanisole | 4-methylcyclohexanone |
| 2,6-dimethyl-1,4-dioxane | Menthone |
| 1-oxa-2,5-dimethylcyclopentane | Isophorone |
| Ethyl sulfide | Nitromethane |
| Hexanol | Nitroethane |
| Heptanol | 1-nitropropane |
| Heptadecanol | Nitrobenzene |
| 2-ethylbutanol | Tributyl phosphate |
| Methylisobutylcarbinol | |

In employing any of the solvents of the above class in the present process, previously known extraction procedures and apparatus may be employed. The extraction may be effected by batch, continuous batch, batch counter-current, or continuous counter-current methods. The most efficient extraction is obtained in continuous counter-current operation. Thus, for example, if the solvent is lighter than water, satisfactory extraction in accordance with this procedure may be obtained by the use of a packed column with aqueous feed at an intermediate point, solvent feed at the bottom of the column, and solvent draw-off at the top of the column. The top section of such a column may serve as a stripping section, and an auxiliary stripping medium may be charged to the top of the column. With certain obivous changes, solvents heavier than water can be employed with substantially equally good results.

Th uranium may be recovered from the solvent extract phase by any suitable procedure such as evaporation of the solvent, crystallization with an isomorphous crystalline carrier, re-extraction with another immiscible solvent, such as water or adsorption on a solid absorbent.

The procedures described above have been found to be extremely useful for the separation and purification of uranium especially with regard to impurities, for example, beryllium, iron, potassium, lithium, magnesium, sodium, and silicon. The uranium which has been purified in accordance with the above-described invention may be used as the fissionable material in the construction of either slow- or fast-neutron chain-reacting systems.

The following are specific examples of the process embodying this invention and these examples are given by way of illustration and not limitation.

Example 1

A 1.5 N solution of hydrochloric acid which contained 1 percent by weight of uranium tetrachloride and 10,000 parts by weight per million, based on the uranium content of the solution, of each of the following impurities, sodium, magnesium, iron, beryllium, lithium, boron, potassium, and phosphorus, was treated with ammonia until a pH of approximately 2 was attained. Ammonium molybdate was added to the above solution, and a precipitate of uranous molybdate was formed. The precipitate of uranous molybdate was separated from the supernatant liquid by centrifugation and was then washed twice with distilled water. The washed precipitate was then heated with 15 N nitric acid which caused the precipitate to dissolve; this also oxidized the uranium to the hexavalent state. The solution was then made 1 M in nitric acid and 10 M in ammonium nitrate by the addition of a concentrated solution of ammonium nitrate. Uranyl nitrate was extracted from this solution by contacting it with an equal volume of ethyl ether. The ether extract was separated from the water and the ether volatilized. At the conclusion of this purification process an analysis of the extracted uranium showed that the impurities originally present had been reduced to the following levels expressed in parts per million of uranium:

| | P. p. m. |
|---|---|
| Na | $<5$ |
| Mg | $<5$ |
| Fe | 35 |
| Be | 0.1 |
| Li | $<0.8$ |
| B | 3.2 |
| K | $<16$ |
| P | 15 |

Example 2

A 1 percent by weight solution of uranium tetrachloride in 1 N nitric acid contained the same impurities in the same amounts as in Example 1. This solution was treated with oxalic acid and the precipitate of uranous oxalate which formed was separated from the supernatant liquid by centrifugation and washed twice with distilled water. The washed precipitate was then heated with 15 N nitric acid which caused the precipitate to dissolve and also oxidized the uranium to the hexavalent state. The oxidized solution was evaporated almost to dryness several times with concentrated nitric acid in order to destroy the oxalate. This solution was then made 1 M in nitric acid and 10 M in ammonium nitrate by the addition of a concentrated solution of ammonium nitrate. Uranyl nitrate was extracted from this solution by contacting the aqueous phase with an equal volume of ethyl ether. At the conclusion of this purification process an analysis of the extracted uranium showed that the impurities originally present had been reduced to the following levels expressed in parts per million of uranium:

| | P. p. m. |
|---|---|
| Na | $<10$ |
| Mg | $<5$ |
| Fe | 5 |
| Be | 0.14 |
| Li | $<0.8$ |
| B | 2.8 |
| K | 24 |
| P | 600 |

Example 3

A 1 percent by weight solution of uranium tetrachloride contained the same impurities in the same amounts as in Example 1. This solution was treated with ammonium sulfite and the precipitate of uranous sulfite which formed was separated from the supernatant liquid by centrifugation and washed twice with distilled water. The washed precipitate was then heated with 15 N nitric acid which caused the precipitate to dissolve and also oxidized the uranium to the hexavalent state. Following the oxidation of the uranium the solution was evaporated to a small volume in order to remove the sulfur dioxide. This solution was then made 1 M in nitric acid and 10 M in ammonium nitrate by the addition of a concentrated solution of ammonium nitrate. Uranyl nitrate was extracted from this solution by contacting the aqueous phase with an equal volume of ethyl ether. At the conclusion of this purification process an analysis of the extracted uranium showed that the impurities originally present had been reduced to the following levels expressed in parts per million of uranium:

| | P. p. m. |
|---|---|
| Na | 100 |
| Mg | $<5$ |
| Fe | 7.5 |
| Be | 0.2 |
| Li | $<0.8$ |
| B | 0.5 |
| K | 40 |
| P | 30 |

While the above invention relating to the use of two oxidation states of uranium in processes for the purification of uranium has been described with particular reference to the use of a solvent extraction process in the purification step involving hexavalent uranium, it will be understood that other procedures which are useful in purifying uranium in the hexavalent state may also be used. For example, the uranium may be selectively absorbed on a cation exchanger, such as zeolite or "Amberlite IR-1," a resinous condensate product of formaldehyde and a phenolsulphonate and the uranium may then be removed from the absorber by a suitable eluant, for example, aqueous sulphuric acid. Another method which may be used for the purification of hexavalent uranium is the precipitation of a uranyl salt such as sodium uranyl acetate or sodium magnesium uranyl acetate or the water-insoluble homologues of these compounds.

It is to be understood, of course, that the above examples are merely illustrative and do not limit the scope of the present invention. Other precipitating agents and solvents of the classes previously described may be substituted for the specific precipitating agents and solvents of these examples and other purification methods may be used and the procedures employed may be modified in numerous respects within the scope of the foregoing description. In general, it may be said that the use of any equivalents or modifications of procedure which would naturally occur to those skilled in the art is included in the scope of the invention. Only such limitations should be imposed on the scope of this invention as are indicated in the appended claim.

What is claimed is:

A process of purifying uranium contained in aqueous nitric acid solution of uranium tetrachloride together with about 10,000 p. p. m. each of the impurities sodium, magnesium, iron, beryllium, lithium, boron, potassium, and phosphorus, comprising adding ammonium molybdate to said solution whereby uranous molybdate and part of said impurities are precipitated, while the remainder of said impurities remains in solution; separating the precipitate from the solution; heating said precipitate with 15 N nitric acid whereby it is dissolved and the uranium is oxidized to its hexavalent state; diluting the solution with water so as to obtain a nitric acid concentration of approximately 1 N; adding ammonium nitrate to the solution; contacting the solution with diethyl ether whereby the uranyl nitrate is taken up by the ether while the impurities remain in an aqueous phase; and separating the ether solution from said aqueous phase.

References Cited in the file of this patent

UNITED STATES PATENTS

| | | |
|---|---|---|
| 2,227,833 | Hixson et al. | Jan. 7, 1941 |
| 2,690,376 | Hoffman | Sept. 28, 1954 |
| 2,768,871 | Brown et al. | Oct. 30, 1956 |

OTHER REFERENCES

Misciatelli: Chemical Abstracts, vol. 25, pp. 1452, 1453 (1931).

Mellor: Inorganic and Theoretical Chem., vol. 12, pp. 112, 117 (1932), publ. by Longmans, Green & Co., London.

Accum: A Practical Essay on Chemical Reagents or Tests, p. 68 (1817), M. Carey & Son, Phila.

Rosenheim et al.: Zeitschrift für anorganische und allgemeine Chemie, vol. 206, pp. 33, 34 (1932).